(12) United States Patent
Cha et al.

(10) Patent No.: US 10,300,966 B2
(45) Date of Patent: May 28, 2019

(54) VARIABLE REAR SPOILER APPARATUS OF REAR BUMPER FOR VEHICLE

(71) Applicants: Hyundai Motor Company, Seoul (KR); Kia Motors Corporation, Seoul (KR)

(72) Inventors: Dong Eun Cha, Seongnam-si (KR); Jin Young Yoon, Gimpo-si (KR); Hyun Gyung Kim, Hwaseong-si (KR); Soo Hyun Hyun, Gyeongju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 45 days.

(21) Appl. No.: 15/610,452

(22) Filed: May 31, 2017

(65) Prior Publication Data
US 2018/0134330 A1 May 17, 2018

(30) Foreign Application Priority Data

Nov. 15, 2016 (KR) .................. 10-2016-0151737

(51) Int. Cl.
*B60J 9/00* (2006.01)
*B62D 35/00* (2006.01)
(Continued)

(52) U.S. Cl.
CPC .......... *B62D 35/007* (2013.01); *B62D 37/02* (2013.01); *B62D 35/02* (2013.01); *Y02T 10/82* (2013.01); *Y02T 10/88* (2013.01)

(58) Field of Classification Search
CPC .... B62D 35/007; B62D 37/02; B62D 35/005; B64C 9/323; B64C 9/32; Y02T 50/32;
(Continued)

(56) References Cited

U.S. PATENT DOCUMENTS 4,629,240 A * 12/1986 Dornier ............... B62D 35/007
180/903
4,773,692 A * 9/1988 Schleicher ........... B62D 35/007
296/180.5

(Continued)

FOREIGN PATENT DOCUMENTS

DE 102011103787 A1 12/2012
DE 102013101296 A1 8/2014
(Continued)

*Primary Examiner* — Kiran B Patel
(74) *Attorney, Agent, or Firm* — Slater Matsil, LLP

(57) ABSTRACT

Disclosed herein is a variable rear spoiler apparatus of a rear bumper for a vehicle. The variable rear spoiler apparatus includes a linkage mechanism configured to be installed on a bumper back beam and having a length varying in a vertical direction when the linkage mechanism undergoes a rotation. A spoiler is connected to the linkage mechanism and is able to move up and down by the rotation of the linkage mechanism. A first driving mechanism, installed at the bumper back beam, is provided with a first rotation shaft connected to the linkage mechanism to transfer a torque. The spoiler is moved up and down by the rotation of the linkage mechanism by a rotation of the first rotation shaft. A second driving mechanism is connected to the first rotation shaft. The spoiler is tilted by a length varying operation of the second driving mechanism.

20 Claims, 5 Drawing Sheets

(51) Int. Cl.
 B62D 37/02 (2006.01)
 B62D 35/02 (2006.01)
(58) Field of Classification Search
 CPC .. B29C 66/71; C08L 21/00; B60R 2019/1886
 USPC ............... 296/180.5, 180.1, 180.3; 180/903;
 293/117, 120; 244/213, 215
 See application file for complete search history.

(56) References Cited

U.S. PATENT DOCUMENTS

| | | | |
|---|---|---|---|
| 5,141,281 A * | 8/1992 | Eger | B62D 35/007 296/180.5 |
| 5,165,751 A | 11/1992 | Matsumoto et al. | |
| 6,196,620 B1 * | 3/2001 | Haraway, Jr. | B62D 35/007 180/903 |
| 7,052,074 B2 * | 5/2006 | Dringenberg | B62D 35/007 296/180.5 |
| 7,481,482 B2 | 1/2009 | Grave et al. | |
| 7,717,494 B2 | 5/2010 | Nagahama | |
| 7,770,962 B1 * | 8/2010 | Maxwell | B62D 35/007 296/180.5 |
| 7,841,646 B2 | 11/2010 | Paul et al. | |
| 8,403,401 B2 * | 3/2013 | Rinehart | B62D 35/001 296/180.3 |
| 9,102,367 B1 * | 8/2015 | Beierl | B62D 37/02 |
| 9,168,960 B2 | 10/2015 | Lee et al. | |
| 9,174,687 B2 * | 11/2015 | Jeong | B62D 35/007 |
| 9,527,535 B1 * | 12/2016 | Cha | B62D 35/007 |
| 9,764,615 B2 * | 9/2017 | Mosher | B60G 99/006 |
| 9,821,754 B2 * | 11/2017 | Farooq | B60R 21/34 |
| 9,950,751 B2 * | 4/2018 | Heil | B62D 35/00 |
| 2002/0067049 A1 * | 6/2002 | Pettey | B62D 35/007 296/180.5 |
| 2004/0256885 A1 * | 12/2004 | Bui | B62D 35/007 296/180.5 |
| 2005/0077753 A1 * | 4/2005 | Burg | B62D 35/007 296/180.5 |
| 2005/0168013 A1 * | 8/2005 | Rinklin | B62D 35/007 296/180.1 |
| 2007/0145776 A1 * | 6/2007 | Grave | B62D 35/007 296/180.5 |
| 2007/0228772 A1 * | 10/2007 | Froeschle | B62D 35/007 296/180.1 |
| 2008/0179914 A1 * | 7/2008 | Wegener | B62D 35/007 296/180.1 |
| 2009/0286461 A1 * | 11/2009 | Molnar | B62D 35/007 454/152 |
| 2010/0026044 A1 * | 2/2010 | Ramin | B60Q 1/2619 296/180.1 |
| 2011/0169299 A1 * | 7/2011 | Goenueldinc | B62D 35/007 296/180.5 |
| 2014/0021742 A1 * | 1/2014 | Durm | B62D 35/007 296/180.5 |
| 2015/0274223 A1 * | 10/2015 | Wolf | B62D 35/007 296/180.5 |
| 2016/0046334 A1 * | 2/2016 | Jeong | B62D 35/007 296/180.5 |
| 2016/0059911 A1 * | 3/2016 | Shiga | B62D 35/007 296/180.5 |
| 2017/0050684 A1 | 2/2017 | Kim | |
| 2017/0088192 A1 * | 3/2017 | Auden | B62D 35/00 |
| 2017/0088194 A1 * | 3/2017 | Heil | B62D 35/00 |
| 2017/0092022 A1 * | 3/2017 | Heil | B62D 35/005 |
| 2017/0113741 A1 | 4/2017 | Wolf | |
| 2017/0120968 A1 | 5/2017 | Povinelli et al. | |
| 2017/0151984 A1 * | 6/2017 | Bray | B62D 35/007 |
| 2017/0274944 A1 * | 9/2017 | Nakamura | B62D 37/02 |
| 2018/0001944 A1 * | 1/2018 | Causley | B62D 37/02 |
| 2018/0009402 A1 | 1/2018 | Cha et al. | |
| 2018/0043946 A1 * | 2/2018 | Barber | B62D 37/02 |
| 2018/0050741 A1 * | 2/2018 | Wolf | B62D 35/007 |
| 2018/0093716 A1 | 4/2018 | Povinelli et al. | |
| 2018/0111650 A1 * | 4/2018 | Swantick | B62D 37/02 |
| 2018/0134328 A1 * | 5/2018 | Yoon | B62D 37/02 |

FOREIGN PATENT DOCUMENTS

| | | |
|---|---|---|
| EP | 1840016 B1 | 11/2010 |
| JP | 07137668 A | 5/1995 |
| JP | 3078686 U | 4/2001 |
| JP | 2006219074 A | 8/2006 |
| JP | 2006248355 A | 9/2006 |
| JP | 2009248746 A | 10/2009 |
| KR | 1019980030333 A | 7/1998 |
| KR | 101363078 B1 | 2/2014 |
| KR | 101526735 B1 | 6/2015 |
| KR | 20150072715 A | 6/2015 |

* cited by examiner

VARIABLE REAR SPOILER APPARATUS OF REAR BUMPER FOR VEHICLE

CROSS-REFERENCE TO RELATED APPLICATIONS

The present application claims priority to Korean Patent Application No. 10-2016-0151737, filed on Nov. 15, 2016, the entire contents of which is incorporated herein for all purposes by this reference.

TECHNICAL FIELD

The present invention relates to a variable rear spoiler apparatus of a rear bumper for a vehicle.

BACKGROUND

A vehicle has a difficulty in increasing a driving speed and a problem of degrading driving stability as a grip force of a rear tire is weakened at the time of high speed driving or turning.

In order to solve the problem, an air spoiler is provided at a rear of a vehicle to change a flow of air passing through the vehicle, and thus a pressure for pressing the vehicle depending on the airflow around the air spoiler is generated, thereby improving the grip force of the rear tire.

The air spoiler is installed at the rear of the vehicle, which restricts a degree of freedom in design. Further, when the air spoiler is installed once, it is difficult to change a design and when the air spoiler is applied to a luxury vehicle, the design may be hindered due to the installation of the air spoiler.

As described above, a technology for improving aerodynamic performance to improve fuel efficiency and driving stability of a vehicle restrictively applies the air spoiler and has a problem in that a shape of the vehicle or specifications of the air spoiler need to be changed in order to more improve the aerodynamic performance.

The matters described as the related art have been provided only for assisting in the understanding for the background of the present invention and should not be considered as corresponding to the related art known to those skilled in the art.

SUMMARY

An object of the present invention is to provide a variable rear spoiler apparatus of a rear bumper for a vehicle which is stored at a lower part of the rear bumper and drawn downwardly when being used to regulate airflow, thereby improving driving stability and aerodynamic performance.

According to an exemplary embodiment of the present invention, there is provided a variable rear spoiler apparatus of a rear bumper for a vehicle, including: a linkage mechanism configured to be installed on a bumper back beam and have a length varying in a vertical direction at the time of a rotation operation thereof; a spoiler configured to be connected to the linkage mechanism to move up and down by the rotation of the linkage mechanism; a first driving mechanism configured to be installed at the bumper back beam, provided with a first rotation shaft connected to the linkage mechanism to transfer a torque, and move the spoiler up and down by rotating the linkage mechanism by a rotation of the first rotation shaft when being operated; and a second driving mechanism configured to be connected to the first rotation shaft to move up and down together with the spoiler by the rotation of the first rotation shaft and have a length varying portion connected to an end of the spoiler so that the spoiler is tilted by a length varying operation of the length varying portion at the time of an operation thereof.

The linkage mechanism may include: a fixing bracket configured to be fixed to the bumper back beam and connected to the first rotation shaft by penetrating the first rotation shaft through the fixing bracket; a driving link configured to have one end installed at the fixing bracket to be connected to the first rotation shaft and be rotated together with the first rotation shaft; a support link configured to have one end rotatably connected to the fixing bracket by a connection link and the other end rotatably connected to the spoiler; and a driven link configured to have one end rotatably connected to the driving link and the other end rotatably connected to the other end side of the support link.

The driving link and the driven link may be formed so as to be unfolded approximately vertically from a folded state when the spoiler completely descends.

The driven link may extend so as to be bent from one end to the other end.

The connection link may have one end rotatably connected to the fixing bracket and the other end rotatably connected to one end of the support link and may be configured in plural to be installed in parallel.

The linkage mechanism may be configured such that the drive link, the driven link, the connection link and the support link are unfolded to form a triangular shape when the spoiler is completely moved downward.

The first driving mechanism may include: a first motor configured to be mounted on a back beam bracket fixed to the bumper back beam to transfer the torque and a first rotation shaft configured to extend in both lateral directions from the first motor to penetrate through the fixing bracket and be connected to the driving link.

The second driving mechanism may be provided with an elevating member to which an elevating link connected to be rotated together with the first rotation shaft is rotatably connected and the elevating member may be provided with a length varying portion connected to the spoiler.

The length varying portion may include: a rotation bracket configured to be rotatably installed at an end of the spoiler; a second motor configured to be installed at the elevating member to transfer a torque; and a connection shaft configured to extend from the second motor to be screwed to the rotation bracket and rotated when the second motor is operated to move the rotation bracket up and down.

The bumper back beam may be installed at the rear of the vehicle and drawn diagonally from the rear toward the front when the spoiler descends.

The length varying portion of the second driving mechanism may be connected to a front end of the spoiler.

DETAILED DESCRIPTION OF ILLUSTRATIVE EMBODIMENTS

Hereinafter, a variable rear spoiler apparatus of a rear bumper for a vehicle according to an exemplary embodiment of the present invention will be described with reference to the accompanying drawings.

Embodiments of the present invention describe a variable rear spoiler apparatus of a rear bumper for a vehicle capable of regulating airflow by moving up and down at a lower side of a rear bumper.

Figure 1:
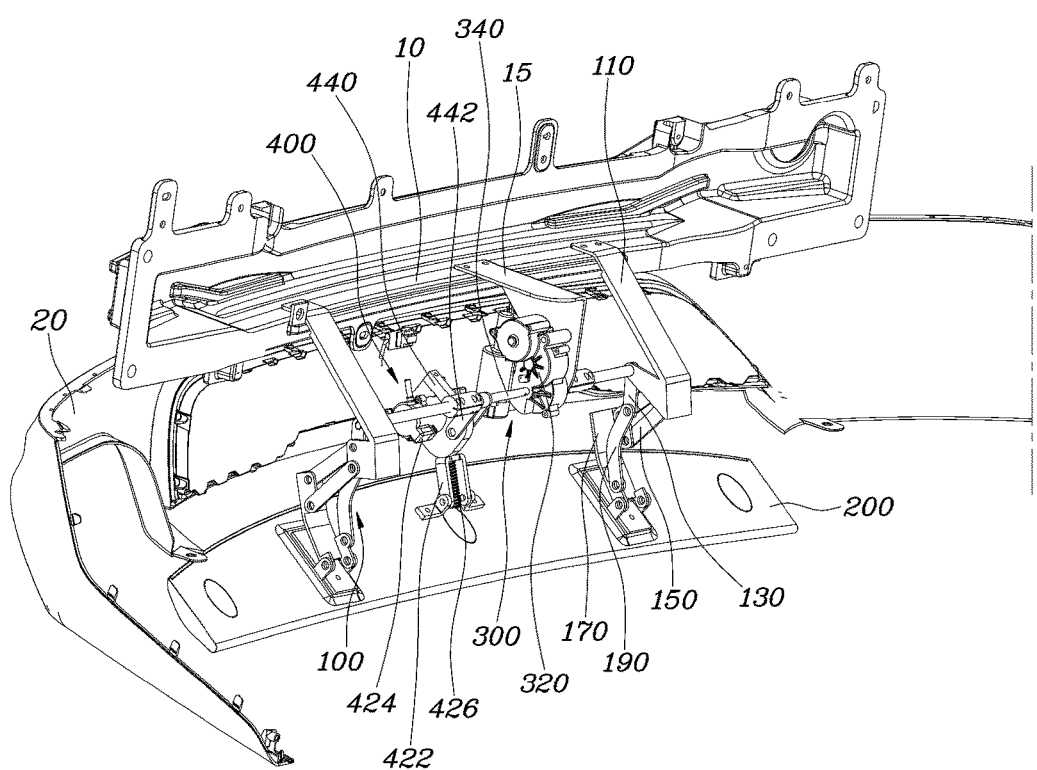
FIG. 1 is a perspective view illustrating a variable rear spoiler apparatus of a rear bumper for a vehicle according to an exemplary embodiment of the present invention.
Figure 2:
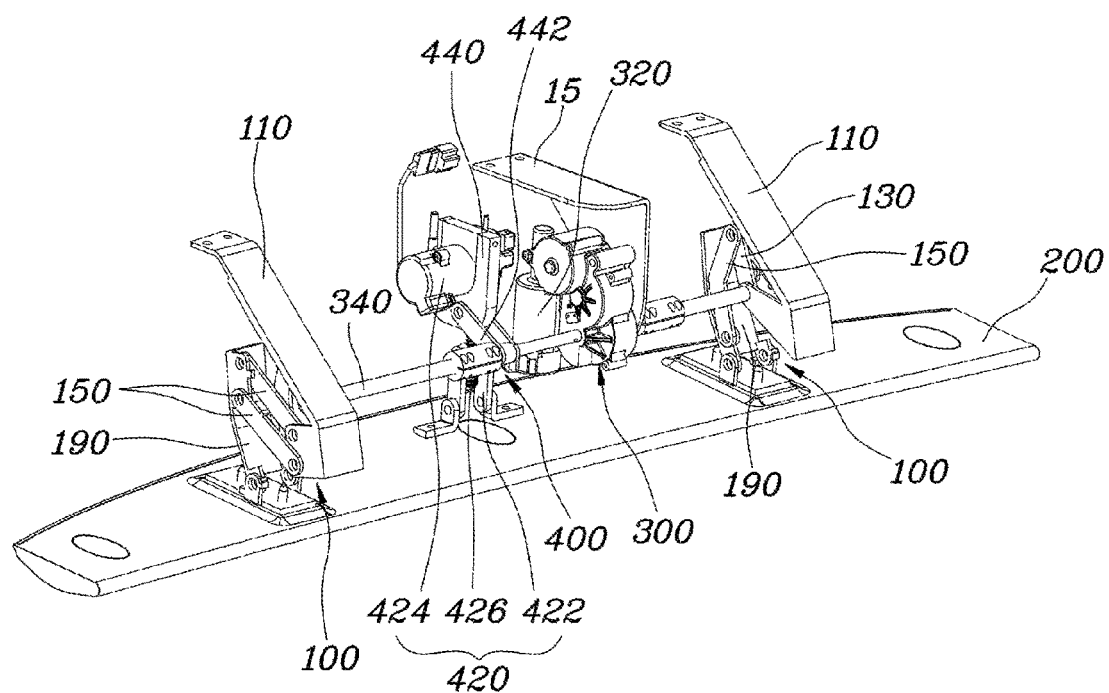
FIGS. 2 and 3 are perspective views illustrating an operating state of the variable rear spoiler apparatus of a rear bumper for a vehicle illustrated in FIG. 1.
Figure 3:
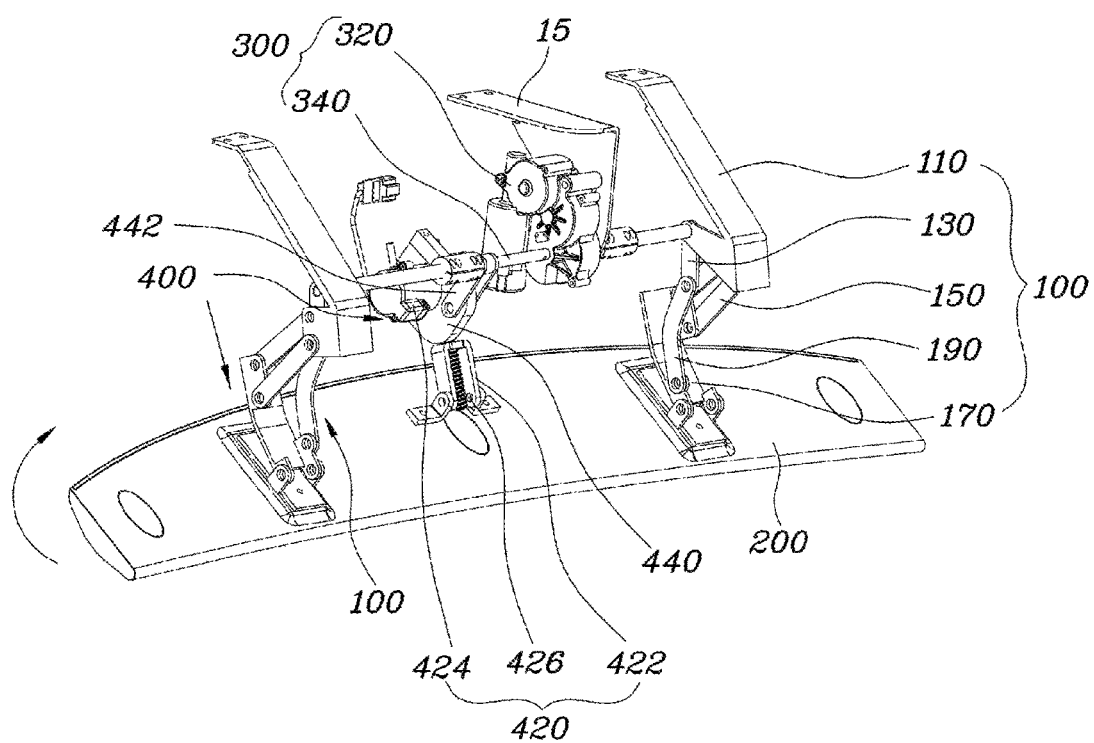
Figure 4:
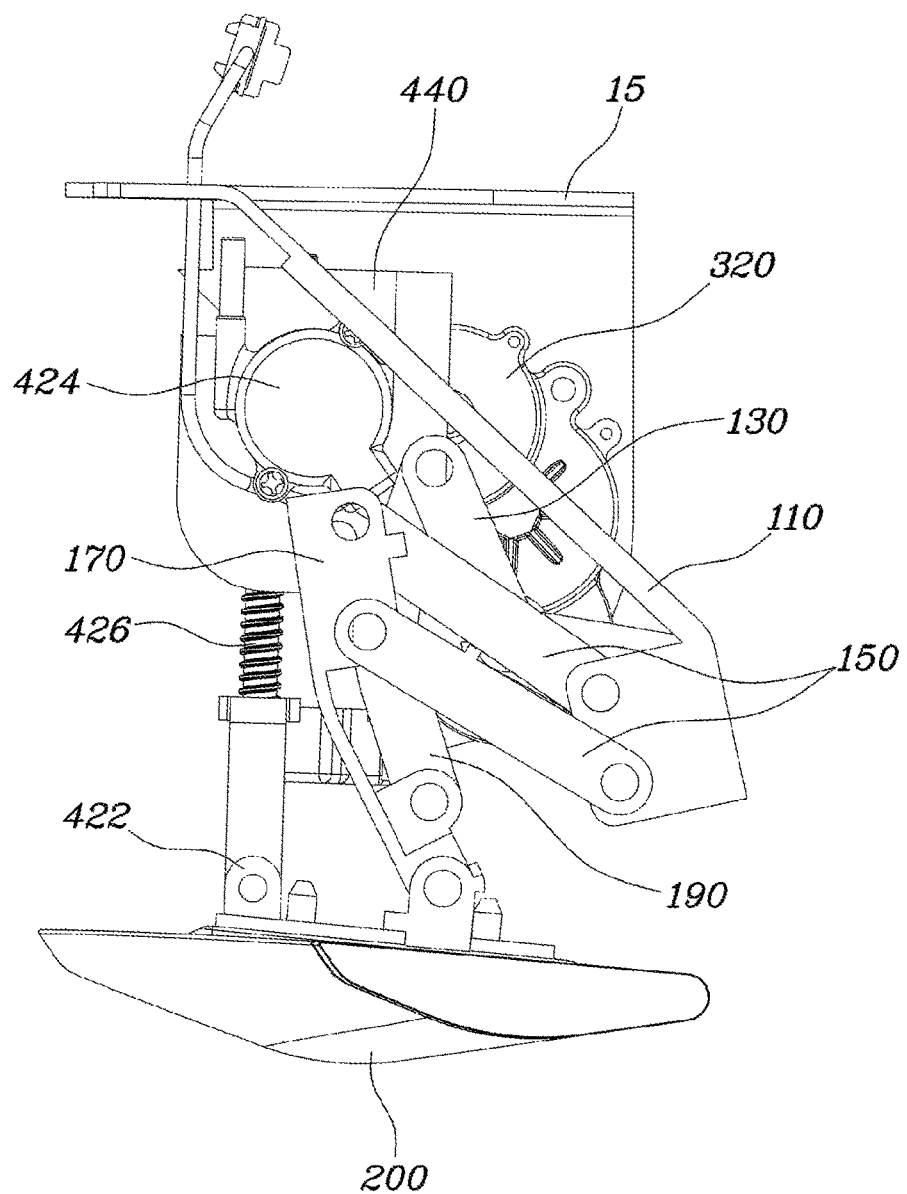
FIGS. 4 and 5 are side views illustrating an operating state of the variable rear spoiler apparatus of a rear bumper for a vehicle illustrated in FIG. 1.
Figure 5:
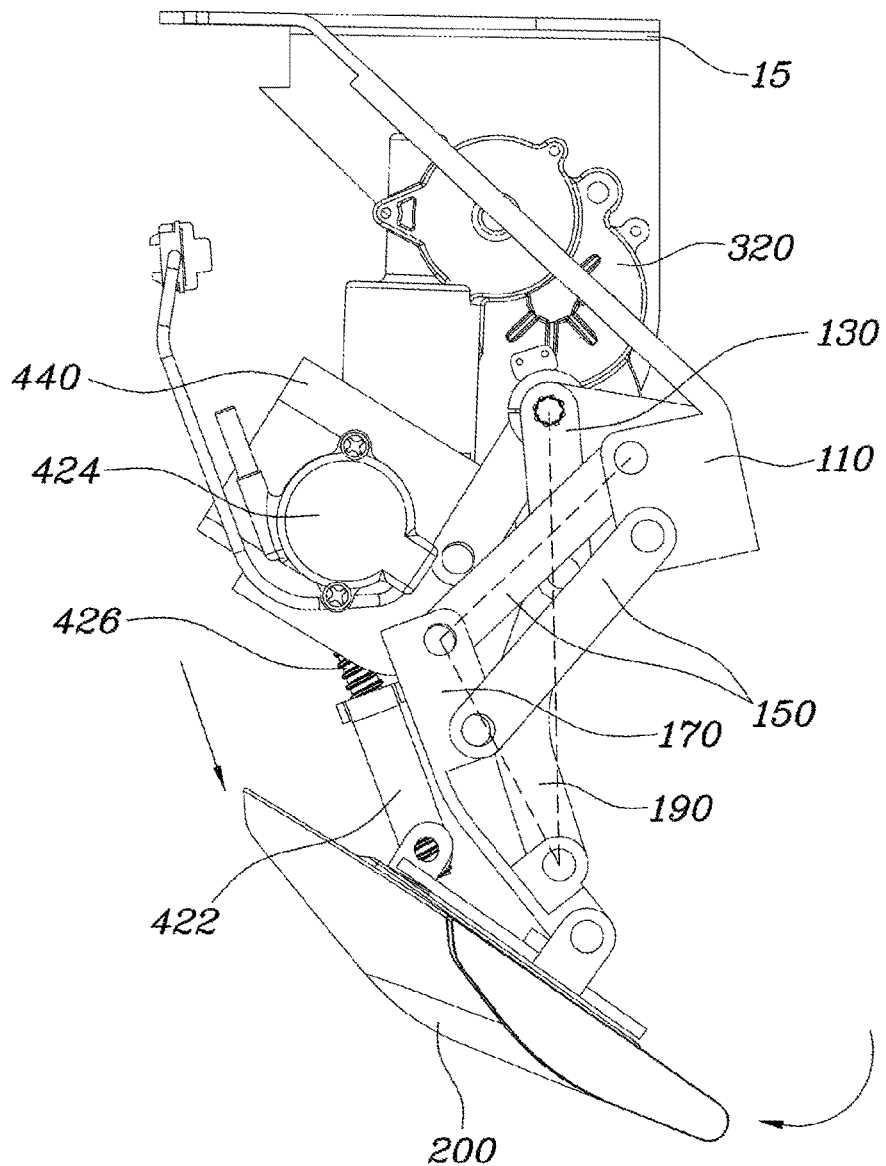

FIG. 1 is a perspective view illustrating a variable rear spoiler apparatus of a rear bumper for a vehicle according to an exemplary embodiment of the present invention, FIGS. 2 and 3 are perspective views illustrating an operating state of the variable rear spoiler apparatus of a rear bumper for a vehicle illustrated in FIG. 1, and FIGS. 4 and 5 are side views illustrating an operating state of the variable rear spoiler apparatus of a rear bumper for a vehicle illustrated in FIG. 1.

As illustrated in FIG. 1, the variable rear spoiler apparatus of a rear bumper for a vehicle according to the exemplary embodiment of the present invention includes: a linkage mechanism 100 configured to be installed on a bumper back beam 10 and have a length varying in a vertical direction at the time of a rotation operation thereof; a spoiler 200 configured to be connected to the linkage mechanism 100 to move up and down by the rotation of the linkage mechanism 100; a first driving mechanism 300 configured to be installed at the bumper back beam 10, provided with a first rotation shaft 340 connected to the linkage mechanism to transfer a torque, and move the spoiler 200 up and down by rotating the linkage mechanism 100 by a rotation of the first rotation shaft 340 when being operated; and a second driving mechanism 400 configured to be connected to the first rotation shaft 340 to move up and down together with the spoiler 200 by the rotation of the first rotation shaft 340 and have a length varying portion 420 connected to an end of the spoiler 200 so that the spoiler 200 is tilted by a length varying operation of the length varying portion 420 at the time of the operation thereof.

As described above, the variable rear spoiler apparatus of a rear bumper for a vehicle according to the exemplary embodiment of the present invention is configured to include the linkage mechanism 100, the spoiler 200, the first driving mechanism 300, and the second driving mechanism 400, in which the linkage mechanism 100 may be installed at both sides of the spoiler 200 while being symmetrical to each other. In this configuration, the linkage mechanism 100 is fixedly installed to the bumper back beam 10, and the bumper back beam 10 may be a bumper back beam 10 provided at the rear bumper side. The linkage mechanism 100 may be configured of a plurality of links and have the length varying in the vertical direction by a folded or unfolded operation by the rotation of the plurality of links.

Meanwhile, the spoiler 200 is connected to the linkage mechanism 100 to change the length of the linkage mechanism 100 in the vertical direction, such that the spoiler 200 is configured to move up and down. As a result, the spoiler 200 is stored in the bumper cover 20 provided at the bumper back beam 10 in an initial state and may regulate airflow when descending toward a lower part of the bumper cover 20. The spoiler 200 may have a shape in which it may appropriately regulate the airflow in a state in which it is exposed at the lower part of the rear bumper, and the shape of the spoiler 200 may be variously formed according to vehicles.

According to the exemplary embodiment of the present invention, the first driving mechanism 300 for regulating the rotation of the linkage mechanism 100 is installed to move the spoiler 200 up and down. That is, the first driving mechanism 300 is installed at the bumper back beam 10 and is provided with the first rotation shaft 340 connected to the linkage mechanism 100 to transfer a torque and moves the spoiler 200 up and down by rotating the linkage mechanism 100 by the rotation of the first rotation shaft 340 at the time of the operation. As such, the first driving mechanism 300 transfers a torque to the linkage mechanism 100 through the first rotation shaft 340 to rotate the linkage mechanism 100 according to whether the first driving mechanism 300 is operated to thereby move the spoiler 200 up and down and the first driving mechanism 300 stores or draws the spoiler 200.

In particular, the spoiler 200 according to the exemplary embodiment of the present invention may regulate the airflow by performing not only the elevating operation but also the tilting operation.

To this end, the second driving mechanism 400 is connected to the first driving mechanism 300, and the second driving mechanism 400 is connected to the spoiler 200 to allow the spoiler 200 to be tilted at the time of the operation. That is, the second driving mechanism 400 is connected to the first rotation shaft 340 of the first driving mechanism 300 to move up and down together with the spoiler 200 by the rotation of the first rotation shaft 340 and is provided with the length varying portion 420 connected to the end of the spoiler 200 to tilt the spoiler 200 by the length varying operation of the length varying portion 420 at the time of the operation. As described above, as the first driving mechanism 300 is operated, the second driving mechanism 400 follows up the rotation direction of the first rotation shaft 340 at the time of the rotation of the first rotation shaft 340 to move up and down together with the spoiler 200 and the length varying portion 420 is connected to the end of the spoiler 200 to pull or push the end of the spoiler 200 up and down by the length varying operation to thereby tilt the spoiler 200.

As described above, the spoiler 200 according to the exemplary embodiment of the present invention is stored or drawn by moving up and down in the rear bumper according to whether the first driving mechanism 300 is operated and at the same time, the second driving mechanism 400 moves up and down and then the tilting operation is performed according to whether the second driving mechanism 400 is operated, thereby regulating the airflow.

Describing in detail the exemplary embodiment of the present invention as described above, as illustrated in FIGS. 2 and 3, the linkage mechanism 100 includes: a fixing bracket 110 configured to be fixed to the bumper back beam 10 and connected to the first rotation shaft 340 by penetrating the first rotation shaft 340 through the fixing bracket 110; a driving link 130 configured to have one end installed at the fixing bracket no to be connected to the first rotation shaft 340 and be rotated together with the first rotation shaft 340; a support link 170 configured to have one end rotatably connected to the fixing bracket 110 through a connection link 150 and the other end rotatably connected to the spoiler 200; and a driven link 190 configured to have one end rotatably connected to the driving link 130 and the other end rotatably connected to the other end side of the support link 170.

The linkage mechanism 100 includes a link structure including the driving link 130, the connection link 150, the support link 170, and the driven link 190 that connect between the fixing bracket 110 and the spoiler 200. That is, the first rotation shaft 340 extending from a first motor 320 is connected to the fixing bracket 110 by penetrating through the fixing bracket no, and one end of the driving link 130 is rotatably connected to the fixing bracket no but the driving link 130 is connected thereto to be rotated together with the first rotation shaft 340 and thus rotated by the rotation of the first rotation shaft 340 when the first motor 320 is operated. One end of the driven link 190 is connected to the other end of the driving link 130 and the other end of the driven link 190 is rotatably connected to the other end of the support link 170, such that as the other end of the support link 170 is rotatably hinged to the spoiler 200, the spoiler 200 may move by the rotation operation of the driving link 130, the driven link 190, and the support link 170 when the first motor 320 is operated. Here, the spoiler 200 needs to move up and down in the bumper back beam 10, and therefore the connection link 150 is rotatably connected to the fixing bracket 110 and one end of the support link 170, and thus the driving link 130 and the driven link 190 are rotated to push the support link 170 when the first motor 320 is operated and the support link 170 moves while being guided in a vertical direction by the connection link 150 connected to the fixing bracket no and the support link 170.

As a result, the spoiler 200 may move up and down by the driving link 130, the driven link 190, the support link 170, and the connection link 150 that configure the linkage mechanism 100. The plurality of links connecting between the linkage mechanism 100 may all be hinged and thus may be rotatably connected.

Meanwhile, as illustrated in FIG. 3, the driving link 130 and the driven link 190 may be formed so as to be unfolded approximately vertically from the folded state when the spoiler 200 completely descends.

As described above, when the spoiler 200 completely descends, as an angle of the driving link 130 and the driven link 190 is spread to be approximately vertical, the angle of the driving link 130 and the driven link 190 is kept to be approximate to a right angle relative to the spoiler 200, such that a support force of the driving link 130 and the driven link 190 can be sufficiently secured in the state in which the spoiler 200 descends.

In particular, the driven link 190 extends so as to be bent from one end to the other end, and thus the driven link 190 may be smoothly rotated by the rotation of the driving link 130. That is, as illustrated in FIG. 3, the driven link 190 extends so as to be bent in a rotation direction of the driving link 130, and thus when the driving link 130 for the descending operation of the spoiler 200 is rotated, the driven link 190 may be easily applied with a torque in the direction in which the driving link 130 is rotated and may be smoothly rotated in a set direction while following up the rotation direction of the driving link 130.

Meanwhile, the connection link 150 may have one end rotatably connected to the fixing bracket no and the other end rotatably connected to one end of the support link 170 and may be configured in plural to be installed in parallel. One end of the connection link 150 is rotatably hinged to the fixing bracket no and the other end thereof is rotatably hinged to one end of the support link 170, such that when the first motor 320 is operated, the driven link 190 including the driving link 130 and the support link 170 are rotated in the set direction with respect to the vertical direction. In particular, the connection link 150 is connected to the fixing bracket no and the support link 170 to support the spoiler 200 connected to the support link 170, and therefore it is preferable that the connection link 150 is firmly installed to overcome driving wind applied to the spoiler 200. Therefore, the connection link 150 is configured in plural to keep the position of the spoiler 200 despite the driving wind applied to the spoiler 200 while the vehicle is driving, and the plurality of connection links 150 are disposed in parallel with each other and thus the connection link 150 may be smoothly rotated and evenly distribute and support the load to be applied.

Meanwhile, as illustrated in FIG. 5, the linkage mechanism 100 may be configured such that the drive link 130, the driven link 190, the connection link 150 and the support link 170 are unfolded to form a triangular shape when the spoiler 200 is completely moved downward.

As described above, when the spoiler 200 descends, the driving link 130 and the driven link 190 are unfolded to be close to a straight line and the connection link 150 and the support link 170 have an angle to form a triangle shape, such that the load applied to the spoiler 200 can be stably supported while the vehicle is driving. To this end, the lengths of the driving link 130, the driven link 190, the connection link iso, and the support link 170 may be set differently.

Meanwhile, as illustrated in FIGS. 1 to 3, the first driving mechanism 300 includes the first motor 320 configured to be mounted on a back beam bracket 15 fixed to the bumper back beam 10 to transfer a torque and the first rotation shaft 340 configured to extend in both lateral directions from the first motor 320 to penetrate through the fixing bracket 110 and be connected to the driving link 130.

That is, as the first motor 320 is installed at the back beam bracket 15 fixed to the bumper back beam 10, the position of the first motor 320 is fixed, and the first rotation shaft 340 extending in both lateral directions from the first motor 320 is connected to the fixing bracket 110 of the linkage mechanism 100 by penetrating through the fixing bracket 110. Here, the first rotation shaft 340 is rotatably connected to the fixing bracket 110 and the driving link 130 is connected to the first rotation shaft 340 at the fixing bracket 110, such that the driving link 130 and the first rotation shaft 340 are rotated together.

Preferably, the first motor 320 is provided with a gear set having a predetermined reduction ratio and is applied with the predetermined reduction ratio by the gear set, such that the spoiler 200 may be firmly kept at the corresponding position in the state in which the spoiler 200 is stored or drawn. Further, even if a torque of the first motor 320 is not transferred regardless of a drawing angle of the spoiler 200 in a state where the spoiler 200 is drawn, a load of air applied to the spoiler 200 by the gear set may be supported.

Meanwhile, as illustrated in FIGS. 2 and 3, the second driving mechanism 400 may be provided with an elevating member 440 to which an elevating link 442 connected to be rotated together with the first rotation shaft 340 is rotatably connected and the elevating member 440 may be provided with the length varying portion 420 connected to the spoiler 200.

As described above, the second driving mechanism 400 is provided with the elevating member 440, and the elevating link 442 rotatably connected to the elevating member 440 is connected to the first rotation shaft 340 and thus is simultaneously rotated with the rotation of the first rotation shaft 340, such that the elevating member 440 moves up and down. In addition, the elevating member 440 which is provided with the length varying portion 420 is connected to the spoiler 200 and the linkage mechanism 100 rotated while being interlocked to the first rotation shaft 340 are also connected to the spoiler 200, such that when the first rotation shaft 340 is rotated, the elevating member 440 may be moved up and down together with the spoiler 200.

The length varying portion 420 described above includes: a rotation bracket 422 configured to be rotatably installed at an end of the spoiler 200; a second motor 424 configured to be installed at the elevating member 440 to transfer a torque; and a connection shaft 426 configured to extend from the second motor 424 to be screwed to the rotation bracket 422 and rotated when the second motor 424 is operated to move the rotation bracket 422 up and down.

Here, the connection shaft 426 may be rotatably installed at a separate bracket fixedly installed to the end of the spoiler 200 and the second motor 424 may be configured of a forward and reverse motor that transfers a torque. In particular, the connection shaft 426 extending from the second motor 424 and rotated by being applied with a torque is configured as a lead screw, and the rotation bracket 422 is provided with a tap hole so as to be screwed to the connection shaft 426, such that the rotation bracket 422 may move along a longitudinal direction of the connection shaft 426 along a thread of the connection shaft 426 when the connection shaft 426 is rotated by the operation of the second motor 424. As a result, the rotation bracket 422 is moved as the connection shaft 426 is rotated when the second motor 424 of the length varying portion 420 is operated and the rotation bracket 422 is connected to the end of the spoiler 200, such that the spoiler 200 may perform the tilting operation while following up the direction in which the rotation bracket 422 moves.

In the exemplary embodiment of the present invention described above, the bumper back beam 10 may be applied to the rear bumper while being installed at the rear of the vehicle and may be drawn diagonally from the rear toward the front when the spoiler 200 descends, thereby preventing the spoiler 200 from being excessively exposed at the rear bumper. The drawn direction when the spoiler 200 descends may be determined depending on the connection structure of the linkage mechanism 100.

Further, the length varying portion 420 of the first driving mechanism 300 is connected to a front end of the spoiler 200 to move the front end of the spoiler 200 up and down by the length varying operation of the length varying portion 420, such that the tilting operation may be performed.

Further, the first driving mechanism 300 is disposed in front of the second driving mechanism 400 and the driving link 130 of the first driving mechanism 300 and the elevating link 442 of the second driving mechanism 400 are disposed in back thereof with respect to the first rotation shaft 340 to rotate the elevating link 442 and the driving link 130 in the same direction depending on the rotation direction of the first rotation shaft 340, such that the second driving mechanism 400 and the spoiler 200 may ascend and descend in the same direction when the first rotation shaft 340 is rotated.

In addition, the first motor 320 and the second motor 424 may each be operated by a control of a controller, and the first motor 320 and the second motor 424 may be selectively operated according to the driving speed and the turning driving, thereby regulating the airflow depending on the driving situation.

The operation of an embodiment of the present invention will be described below.

As illustrated in FIG. 4, as the first motor 320 of the first driving mechanism 300 is not operated in the state in which the spoiler 200 is stored, the driving link 130 and the driven link 190 connected to the first rotation shaft 340 are folded and the spoiler 200 is kept on being stored at the lower part of the bumper cover 20.

In this state, as illustrated in FIG. 5, when the first motor 320 is operated, the driven link 190 is rotated as the driving link 130 is rotated while being interlocked to the first rotation shaft 340, and the support link 170 connected to the driven link 190 is rotated downward by being guided by the connection link 150 so that the spoiler 200 connected to the support link 170 descends. At this time, the second driving mechanism 400 connected to the first rotation shaft 340 is rotated while being interlocked to the first rotation shaft 340 and thus descends together with the spoiler 200.

As described above, when the second motor 424 is operated in the state in which the spoiler 200 descends, the rotation bracket 422 moves along the thread of the connection shaft 426 as the connection shaft 426 is rotated, such that the tilting operation of the spoiler 200 connected to the rotation bracket 422 is performed.

According to the variable rear spoiler apparatus of a rear bumper for a vehicle having the structure as described above, the variable rear spoiler apparatus is stored at the lower part of the rear bumper and is drawn downward when being used to regulate the airflow, thereby improving the driving stability and the aerodynamic performance.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A variable rear spoiler apparatus of a rear bumper for a vehicle, the variable rear spoiler apparatus comprising:
   a linkage mechanism configured to be installed on a bumper back beam and comprising a length varying in a vertical direction when the linkage mechanism undergoes a rotation;
   a spoiler configured to be connected to the linkage mechanism and configured to move up and down by the rotation of the linkage mechanism;
   a first driving mechanism configured to be installed at the bumper back beam, the first driving mechanism provided with a first rotation shaft connected to the linkage mechanism to transfer a torque, and move the spoiler up and down by the rotation of the linkage mechanism by a rotation of the first rotation shaft; and
   a second driving mechanism configured to be connected to the first rotation shaft, the second driving mechanism configured to move up and down together with the spoiler by the rotation of the first rotation shaft and comprising a length varying portion connected to an end of the spoiler so that the spoiler is tilted by a length varying operation of the length varying portion.

2. The variable rear spoiler apparatus of claim 1, wherein the linkage mechanism includes:
   a fixing bracket configured to be fixed to the bumper back beam and connected to the first rotation shaft by penetrating the first rotation shaft through the fixing bracket;
   a driving link configured to have one end installed at the fixing bracket to be connected to the first rotation shaft and be rotated together with the first rotation shaft;
   a support link configured to have one end rotatably connected to the fixing bracket by a connection link and the other end rotatably connected to the spoiler; and
   a driven link configured to have one end rotatably connected to the driving link and the other end rotatably connected to the other end side of the support link.

3. The variable rear spoiler apparatus of claim 2, wherein the driving link and the driven link are formed so as to be unfolded approximately vertically from a folded state when the spoiler completely descends.

4. The variable rear spoiler apparatus of claim 2, wherein the driven link extends so as to be bent from one end to the other end.

5. The variable rear spoiler apparatus of claim 2, wherein the connection link has one end rotatably connected to the fixing bracket and the other end rotatably connected to one end of the support link and is configured in plural to be installed in parallel.

6. The variable rear spoiler apparatus of claim 2, wherein the linkage mechanism is configured such that the drive link, the driven link, the connection link and the support link are unfolded to form a triangular shape when the spoiler is completely moved downward.

7. The variable rear spoiler apparatus of claim 2, wherein the first driving mechanism includes: a first motor configured to be mounted on a back beam bracket fixed to the bumper back beam to transfer the torque and the first rotation shaft configured to extend in both lateral directions from the first motor to penetrate through the fixing bracket and be connected to the driving link.

8. The variable rear spoiler apparatus of claim 2, wherein the second driving mechanism is provided with an elevating member to which an elevating link connected to be rotated together with the first rotation shaft is rotatably connected and the elevating member is provided with the length varying portion connected to the spoiler.

9. The variable rear spoiler apparatus of claim 8, wherein the length varying portion includes:
- a rotation bracket configured to be rotatably installed at an end of the spoiler;
- a second motor configured to be installed at the elevating member to transfer a torque; and
- a connection shaft configured to extend from the second motor to be screwed to the rotation bracket and rotated when the second motor is operated to move the rotation bracket up and down.

10. The variable rear spoiler apparatus of claim 1, wherein the bumper back beam is installed at the rear of the vehicle and drawn diagonally from the rear toward the front when the spoiler descends.

11. The variable rear spoiler apparatus of claim 1, wherein the length varying portion of the second driving mechanism is connected to a front end of the spoiler.

12. A vehicle with a variable rear spoiler apparatus, the variable rear spoiler comprising:
- a linkage mechanism installed on a bumper back beam, the linkage mechanism configured to be rotated and having a length varying in a vertical direction during a rotation of the linkage mechanism;
- a spoiler connected to the linkage mechanism to move up and down during the rotation of the linkage mechanism;
- a first driving mechanism installed at the bumper back beam, the first driving mechanism comprising a first rotation shaft configured to undergo rotation and connected to the linkage mechanism to transfer a torque, and configured to rotate the linkage mechanism by the rotation of the first rotation shaft; and
- a second driving mechanism connected to the first rotation shaft, the second driving mechanism configured to move up and down together with the spoiler by the rotation of the first rotation shaft and comprising a length varying portion connected to an end of the spoiler so that the spoiler is tilted by a length varying operation of the length varying portion.

13. The variable rear spoiler apparatus of claim 12, wherein the linkage mechanism includes:
- a fixing bracket configured to be fixed to the bumper back beam and connected to the first rotation shaft by penetrating the first rotation shaft through the fixing bracket;
- a driving link configured to have one end installed at the fixing bracket to be connected to the first rotation shaft and be rotated together with the first rotation shaft;
- a support link configured to have one end rotatably connected to the fixing bracket by a connection link and the other end rotatably connected to the spoiler; and
- a driven link configured to have one end rotatably connected to the driving link and the other end rotatably connected to the other end side of the support link.

14. The variable rear spoiler apparatus of claim 13, wherein the driving link and the driven link are formed so as to be unfolded approximately vertically from a folded state when the spoiler completely descends.

15. The variable rear spoiler apparatus of claim 13, wherein the driven link extends so as to be bent from one end to the other end.

16. The variable rear spoiler apparatus of claim 13, wherein the connection link has one end rotatably connected to the fixing bracket and the other end rotatably connected to one end of the support link and is configured in plural to be installed in parallel.

17. The variable rear spoiler apparatus of claim 13, wherein the first driving mechanism includes: a first motor configured to be mounted on a back beam bracket fixed to the bumper back beam to transfer the torque and the first rotation shaft configured to extend in both lateral directions from the first motor to penetrate through the fixing bracket and be connected to the driving link.

18. The variable rear spoiler apparatus of claim 13, wherein the second driving mechanism is provided with an elevating member to which an elevating link connected to be rotated together with the first rotation shaft is rotatably connected and the elevating member is provided with the length varying portion connected to the spoiler.

19. The variable rear spoiler apparatus of claim 18, wherein the length varying portion includes:
- a rotation bracket configured to be rotatably installed at an end of the spoiler;
- a second motor configured to be installed at the elevating member to transfer a torque; and
- a connection shaft configured to extend from the second motor to be screwed to the rotation bracket and rotated when the second motor is operated to move the rotation bracket up and down.

20. A method of operating a variable rear spoiler apparatus of a rear bumper for a vehicle, the method comprising:
- rotating a linkage mechanism installed on a bumper back beam, the linkage mechanism having a length varying in a vertical direction during the rotating;
- moving a spoiler up and down by the rotation of the linkage mechanism, the spoiler connected to the linkage mechanism to move up and down;
- transferring a torque for the rotating through a first driving mechanism installed at the bumper back beam, the first driving mechanism comprising a first rotation shaft connected to the linkage mechanism; and
- moving a second driving mechanism connected to the first rotation shaft up and down together with the spoiler by the rotation of the first rotation shaft; and
- tilting the spoiler by a length varying operation of a length varying portion connected to an end of the spoiler.

* * * * *